United States Patent [19]

Wakamatsu et al.

[11] 4,135,402

[45] Jan. 23, 1979

[54] THERMOCOUPLE TEMPERATURE DETECTING ASSEMBLY

[75] Inventors: Hisato Wakamatsu, Toyota; Akio Yazawa, Oobu, both of Japan

[73] Assignees: Nippondenso Co., Ltd., Kariya; Nippon Soken, Inc., Nishio, both of Japan

[21] Appl. No.: 823,456

[22] Filed: Aug. 10, 1977

[30] Foreign Application Priority Data

Aug. 25, 1976 [JP] Japan ............................ 51-114384[U]

[51] Int. Cl.² .............................................. G01K 7/12
[52] U.S. Cl. ...................................................... 73/361
[58] Field of Search ...................... 73/359 R, 341, 361

[56] References Cited

U.S. PATENT DOCUMENTS

| | | | |
|---|---|---|---|
| 3,007,988 | 11/1961 | Jaffe et al. | 73/359 X |
| 3,073,164 | 1/1963 | Rorden et al. | 73/361 |
| 3,273,395 | 9/1966 | Schwarz | 73/361 X |

Primary Examiner—Jerry W. Myracle
Attorney, Agent, or Firm—Cushman, Darby & Cushman

[57] ABSTRACT

A thermocouple temperature detecting assembly having a temperature detector provided with a thermocouple as a temperature detecting element is disclosed. In a lead wire which is connected to the temperature detector there is provided in the vicinity of the temperature detector a circuit such as a switching circuit for processing an electric signal in accordance with the ambient temperature. The temperature detector and the signal processing circuit are unseparably connected to each other and a compensating lead wire for compensating for the ambient temperature is used only for a short distance between the temperature detector and the signal processing circuit.

7 Claims, 5 Drawing Figures

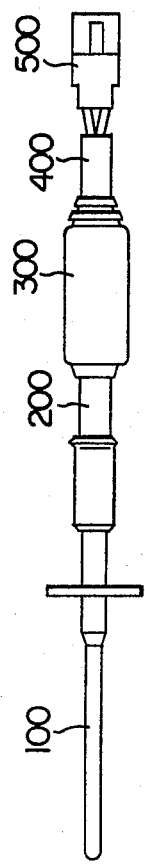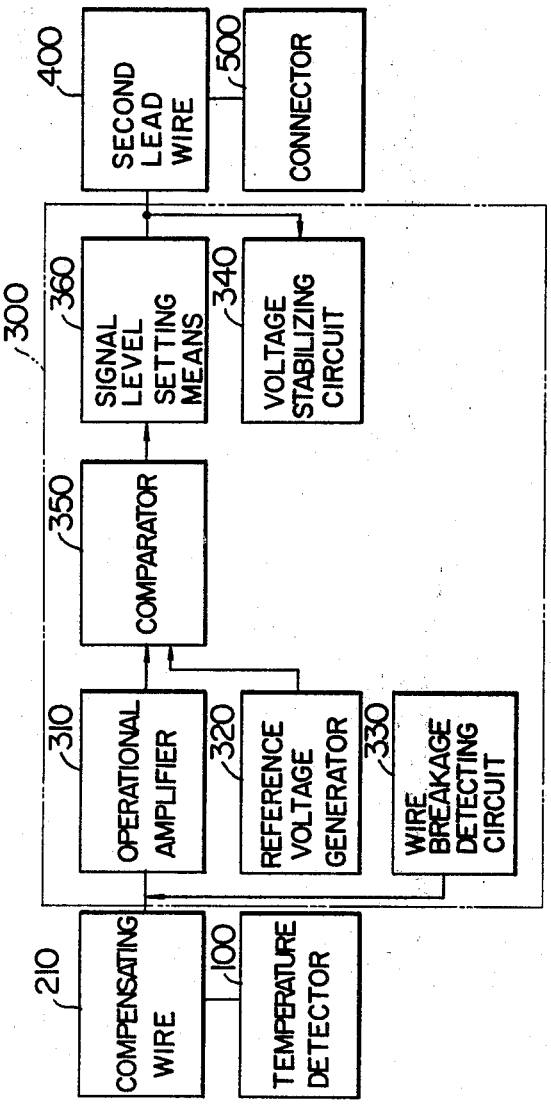

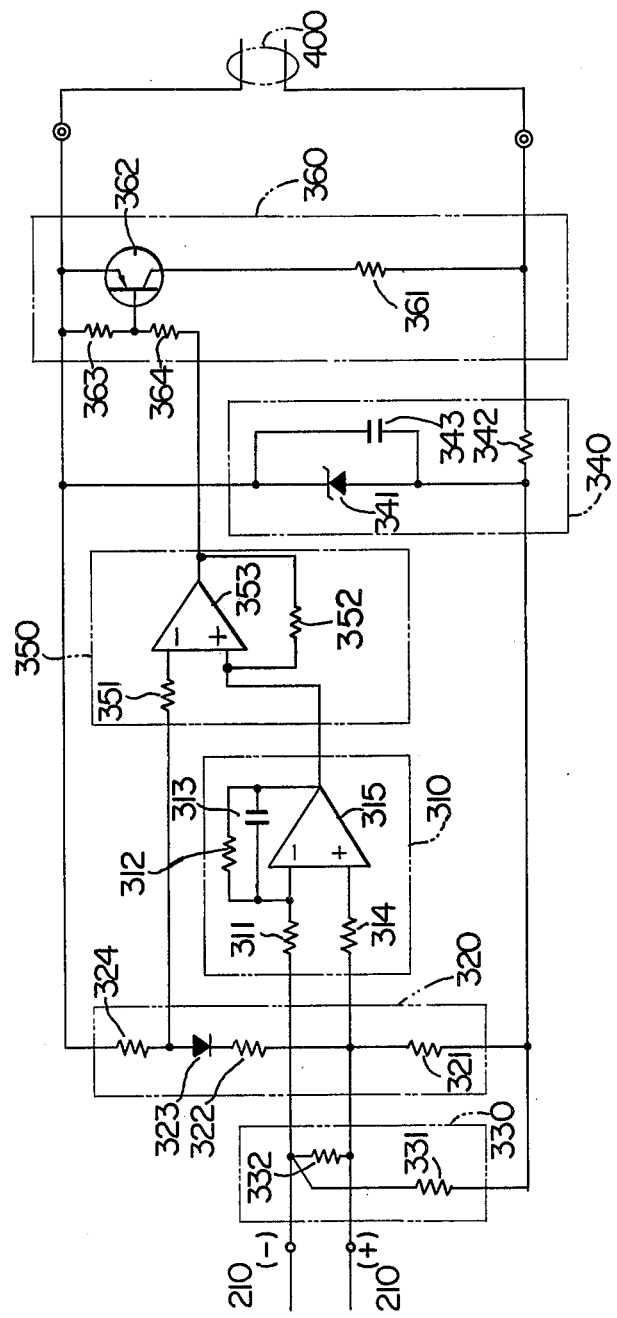
F I G. 3 is liable to noise, a longer distance between the temperature detector and the switching circuit is caused to be disadvantageously more liable to noise. Although sometimes shielding is provided for reducing the effect of noise, the cost is then further increased depending on the distance of the connecting wires. On the other hand, since the connecting means such as connector, terminal or the like is of contact connection, it is possible that faulty contact is caused by the oxidation of contact portions as a result of the contact portions being used for many hours or being unreliably connected.

THERMOCOUPLE TEMPERATURE DETECTING ASSEMBLY

BACKGROUND OF THE INVENTION

The present invention relates to improvements in a temperature detecting assembly having thermocouples, and more particularly, this invention relates to an improvement in the arrangement of a switching circuit included in a temperature detecting assembly in which a switching signal, for example, is provided in accordance with the temperature detected by its temperature detector having a thermocouple as a temperature-sensitive element Generally, in a thermocouple temperature detecting assembly, a temperature detector and a switching circuit for amplifying and discriminating detected values are separated to some extent from each other and are connected by means of compensating lead wires, that is, lead wires of special materials for temperature compensation. Further, connecting mechanism such as terminal, connector or the like is used in at least one point between the temperature detector and the switching element. However, since the compensating lead wires are expensive as compared with usual lead wires, the connection by the compensating lead wires between the temperature detector and the switching circuit, both being separated to some extent from each other, causes the temperature detecting assembly as a whole to be disadvantageously expensive. Further, since the output of the temperature detector using a thermocouple is of the order of several to several tens of millivolts and thus is liable to noise, a longer distance between the temperature detector and the switching circuit is caused to be disadvantageously more liable to noise. Although sometimes shielding is provided for reducing the effect of noise, the cost is then further increased depending on the distance of the connecting wires. On the other hand, since the connecting means such as connector, terminal or the like is of contact connection, it is possible that faulty contact is caused by the oxidation of contact portions as a result of the contact portions being used for many hours or being unreliably connected.

SUMMARY OF THE INVENTION

An object of the present invention is to attain effects such as reduction in cost, improvement in the stability characteristics against noise, improvement in the connection reliability, or the like by arranging the temperature detector and the switching circuit at a distance to each other as near as possible to thereby reduce the length of the compensating lead wires and, further, by connecting between the temperature detector and the compensating lead wires, and the compensating lead wires and the signal processing circuit such as a switching circuit undetachably by means of soldering, welding, or the like. Since, according to the present invention, the signal processing circuit can be provided in the vicinity of the temperature detector, the lead wires from the temperature detector to the switching circuit can be considerably shortened in comparison with those of conventional ones. As a result, the amount used of the expensive compensating lead wires can be made small and it is possible to manufacture the device at low cost, and further the influence by noise can be reduced to be a minimum. These are remarkable effects of this invention.

Further since all the connections from the temperature detector through the lead wires to the signal processing circuit are performed undetachably by means of soldering, welding or the like, the misoperations caused by the conventional contact connection can be completely eliminated, that is, the reliability can be considerably improved, and further since the temperature detector, the signal processing circuit and the connecting means are connected integrally the handling of the device is facilitated, thus a remarkable effect can be obtained by this invention.

Other objects, features and advantages of the present invention will be readily apparent from the detailed description taken in conjunction with the accompanying drawings.

DESCRIPTION OF THE DRAWINGS

FIG. 1 is an extenal view showing an embodiment of a temperature detecting assembly according to the present invention, FIG. 2 is a block diagram showing the embodiment of the present invention, FIG. 3 is an electrical circuit diagram showing in detail the switching circuit in the block diagram shown in FIG. 2.

DESCRIPTION OF THE PREFERRED EMBODIMENT

Figure 4:
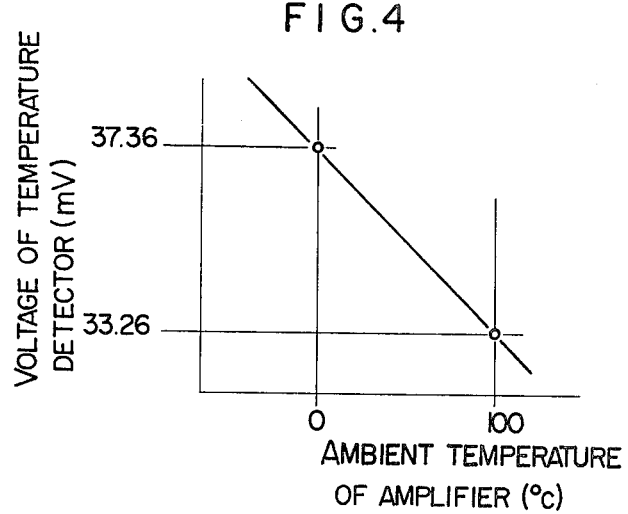
FIG. 4 is a graph showing the switching operation point versus ambient temperature characteristics in the embodiment of the present invention.

The present invention will be described in detail hereinunder with respect to one embodiment shown in FIGS. 1 to 5. FIG. 1 is an external view showing one embodiment of the present invention. Reference numeral 100 designates a temperature detector which includes therein as a temperature detecting element a thermocouple of chromel-alumel, for example, for producing the thermoelectric effect and is inserted in the temperature detecting portion. Numeral 200 designates a first lead wire which includes a compensating wire adapted to match the thermocouple and the lead wire is undetachably connected to the temperature detector 100. The first lead wire 200 is preferably formed as short as possible. Numeral 300 designates a switching circuit portion which includes integrally within its case a signal processing circuit and is undetachably connected with the first lead wire 200 at a distance such that the switching circuit portion 300 is not so influenced through the lead wire 200 by the temperature of the temperature detector portion 100. Numeral 400 designates a second lead wire, and numeral 500 designates a connector which is adapted to be connected detachably with another connector (not shown), both the parts 400 and 500 may be commercially available general ones.

FIG. 2 is a block diagram showing the constitution of the embodiment of the present invention. FIG. 3 is an electrical circuit showing the details of the switching circuit 300 mainly serving as a signal processing circuit. Numeral 310 designates an operational amplifier for amplifying an output from the thermocouple which is substantially proportional to the detected temperature and is supplied from both terminals of the thermocouple in the temperature detector 100 through the compensating wire 210 in the first lead wire 200. The amplification factor is set by the ratio between an input resistor 311 and a feedback resistor 312. Numeral 313 designates a capacitor for decreasing the high-frequency region yield, numeral 314 designates a stabilizing resistor, and numeral 315 designates an a.c. amplifier. Numeral 320 designates a reference voltage generator which supplies the bias voltage of the amplifier 310 at the voltage value across the resistor 321 and which provides the compensation characteristics of the cold contact of the thermocouple by changing the reference voltage through a resistor 322 and a temperature-sensitive diode 323 in response to the ambient temperature. Numeral 330 designates a wire breakage detecting circuit. Since the temperature detector 100 has usually an internal resistance of less than 1Ω, normally a resistor 332 is substantially short-circuited across both ends. However, when the temperature detector 100 or the compensating lead wire 210 is broken, the voltage across the resistor 321 to the resistor 332 is applied through the resistor 331. By making this voltage value be larger than that generated by the temperature detector 100 at a set temperature, the wire breakage detecting circuit 330 operates just as in the case of excessive temperature increase. Numeral 340 designates a voltage stabilizing circuit which serves to stabilize the source voltage and includes a constant voltage diode 341, a series resistor 342 and a capacitor 343. Numeral 350 designates a comparator which compares the output voltage of the amplifier 310 with that of the reference voltage generator 320 so as to perform a switching action at the predetermined temperature. This circuit includes an amplifier 353 and resistors 351, 352 and is adapted to have a hysteresis characteristic by using a positive feedback. Since, by utilizing the temperature-dependent characteristic in the reference voltage of the reference voltage generator 320, the switching operation points of the comparator 350 are obtained as shown in FIG. 4; it is possible to perform a cold contact temperature compensation of the temperature detector 100. Numeral 360 designates a signal level setting means which sets an output signal level for transmitting the switching operation. The output from the comparator 350 is introduced through resistors 363 and 364 to a transistor 362 to make a current amplification. Then, the high current level is set by a resistor 361 while the low current level is set by a resistor 342.

Figure 5:
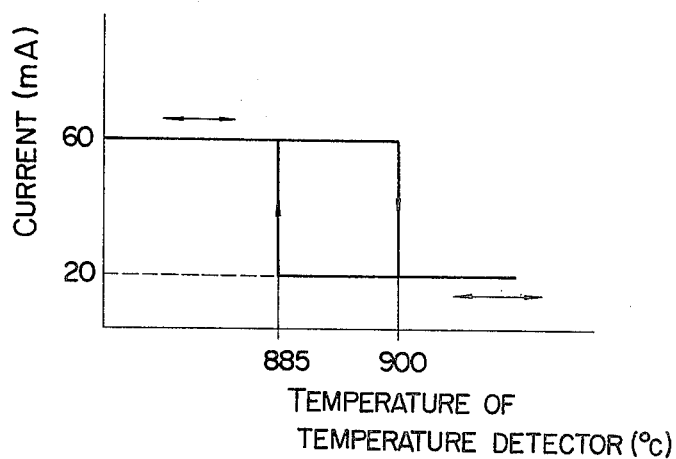
FIG. 5 is a graph showing the temperature of a temperature detector versus output current of a switching current circuit characteristics in the embodiment of the present invention.

FIG. 5 shows the output characteristics of the switching circuit 300 having the above-described constitution. Further, although by suitably designing the shape of the printed board, the switching circuit 300 can be made to have a protecting case of 20 mm in outer diameter as shown in FIG. 1 in the embodiment of the present invention, it will be also possible to make the outer diameter thinner.

Further, in practical use, it is preferable to use a power source, a current discriminating circuit, an output circuit or the like other than the temperature detecting assembly according to the present invention as shown in FIGS. 1 and 2 are to be employed in combination. The power source is a d.c. source which supplies voltage and current as required through the connector 500 and the second lead wire 400 to the switching circuit 300. The current discriminating circuit serves to discriminate the current level, as shown in FIG. 5, which is supplied from the power source to the switching circuit 300 for converting the current level into an on-off signal. The output circuit serves to amplify or convert into a power form suitable for driving other means in dependene on the on-off signal.

Next, the operation and action of the assembly of the above-described constitution according to the present invention will be described. The temperature detector 100 generates a thermoelectromotive force of several to several tens of millivolts depending on the temperature of the temperature-sensitive portion at the top of the detector, which voltage is applied through the first lead wire 200 to the amplifier 310 in the switching circuit 300. The voltage which has been amplified by a factor of several tens is applied to the comparator 350 where the voltage is compared with that of the reference voltage generator 320 and is converted into an on-off signal. In this case, the amplification degree of the amplifier 310 and the reference voltage of the reference voltage generator 320 are suitably set so that the comparator 350 may start switching operation when the temperature at the temperature sensitive portion of the temperature detector 100 reaches a predetermined temperature. Although in general the thermocouple varies in its detecting voltage at the ends of the compensating wires 210 depending on the temperature at the cold contact or the temperature at the ends of the compensating wire 210, the reference voltage generator 320 is made to have temperature compensating characteristics whereby switching can be performed at a fixed temperature irrespective of the temperature at the cold contact.

The output from the comparator 350 is introduced to the signal level setting means 360 and after the output is converted into a current value as shown in FIG. 5 in response to the on-off output from the comparator 350, that is, the temperature at the temperature sensitive portion of the temperature detector 100, the current value is transmitted through the second lead wire 400 and the connector 500 to a remote current discriminating circuit (not shown). Further, by means of the voltage adjusting circuit 340 the voltage supplied to the amplifier 310, the comparator 350 and the reference voltage generator 320 is kept constant and thereby the point of switching operation is stabilized. By using the wire breakage detecting circuit 330 it is so constructed that the comparator 350 discriminates, when the temperature detector 100 or the compensating wire 210 is disconnected, just as in the case of excessive increase in temperature and thus it results that the provision against trouble is made more completely. Also in the case of the disconnection of the second lead wire 400 or the faulty connection of the connector 500, the current discriminating circuit is made to discriminate just as in the case of excessive increase in temperature because, as shown in FIG. 5, a high current level is set for the normal condition, that is, for low detection temperature and a low current level is set for excessive increase in temperature.

Besides, although, in the above-described embodiment, the first lead wire 200 is disposed between the temperature detector 100 and the switching circuit 300, it is of course possible that the temperature detector 100 and the switching circuit 300 are integrally formed within a case.

Further, although it is a little different from the above-described embodiment the arrangement such as the following can be readily thought of from the present invention, that is, to dispose only the amplifier between the first and second lead wires 200 and 400 as the signal processing circuit, and to provide the comparator at a portion further to the connector 500 which portion is not shown in the drawings or, in addition to the constitution shown in FIG. 2, to provide the whole or any of a power source, a current discriminating circuit and an output circuit in the signal processing circuit.

What is claimed is:

1. A thermocouple temperature detecting assembly comprising:
    a thermocouple temperature detector for generating a detection voltage due to the thermoelectric effect of a thermocouple;
    a first lead wire, securely connected to said thermocouple and adapted to match the thermoelectric effect of said thermocouple for transmitting said detection voltage;
    a reference voltage generator, securely connected to said first lead wire, for generating a reference voltage which is varied in accordance with the ambient temperature thereof compensating the thermoelectric effect of said thermocouple;
    an amplifier, securely connected to said first lead wire and packaged with said reference voltage generator, for amplifying said detection voltage transmitted through said first lead wire;
    a second lead wire, securely connected to said amplifier, for transmitting the amplified voltage;
    a detachable connector, connected to said second lead wire, for receiving said amplified voltage; and
    a comparator, connected between said amplifier and said second lead wire and packaged with said reference voltage generator, for comparing said amplified voltage with said reference voltage;
    whereby said amplifed voltage is reshaped into an on-off signal which is transmitted to said detachable connector through said second lead wire.

2. A thermocouple temperature detecting assembly according to claim 1 further comprising:
    a breakage detection circuit, connected between said first lead wire and said amplifier, for detecting the breakage of said thermocouple and said first lead wire, said breakage detection circuit causing said amplifier to generate said amplified voltage which exceeds said reference voltage.

3. A thermocouple temperature detecting assembly according to claim 1 further comprising:
    a voltage regulating circuit packaged with said reference voltage generator and having a zener diode which supplies said reference voltage generator with a constant voltage.

4. A thermocouple temperature detecting assembly according to claim 3, wherein said reference voltage generator includes:
    a diode responsive to the changes of temperature thereof; and
    a resistor connected in series with said diode for generating said reference voltage which is varied by said diode.

5. A thermocouple temperature detecting assembly comprising:
    thermocouple means for generating a detection voltage due to the thermoelectric effect thereof;
    first lead wire means electrically connected to said thermocouple means for transmitting said detection voltage;
    amplifier means electrically connected to said first lead wire means for amplifying said detection voltage transmitted through first lead wire means;
    casing means encasing said thermocouple means, said first lead wire means and said amplifier means therein; and
    second lead wire means extending from said casing means for transmitting an electric signal corresponding to the amplified detection voltage from inside to outside said casing.

6. A thermocouple temperature detecting assembly according to claim 5 further comprising:
    reference means encased within said casing means and electrically connected to said first lead wire means for establishing a reference voltage, said reference means including a diode effective to vary said reference voltage in response to the temperature of said first lead wire means; and
    comparator means encased within said casing means and electrically connected to said amplifier means and said reference means for comparing said amplified detection voltage with said reference voltage, said comparator means being effective to vary the signal level of said electric signal transmitted through said second lead wire means.

7. A thermocouple temperature detecting assembly according to claim 6, wherein said second lead wire means comprises a pair of electric lead wires across which a direct current voltage is supplied, and wherein said reference means further comprises resistors connected in series with said diode across said electric lead wires for dividing said direct current voltage to establish said reference voltage.

* * * * *